(12) United States Patent
Max et al.

(10) Patent No.: US 11,841,244 B2
(45) Date of Patent: Dec. 12, 2023

(54) METHOD FOR CALIBRATING A POSITION SENSOR IN A VEHICLE, COMPUTER PROGRAM, STORAGE MEANS, CONTROL UNIT AND CALIBRATION ROUTE

(71) Applicant: Volkswagen Aktiengesellschaft, Wolfsburg (DE)

(72) Inventors: Stephan Max, Gifhorn (DE); Michael Rohlfs, Rötgesbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/045,284

(22) PCT Filed: Mar. 27, 2019

(86) PCT No.: PCT/EP2019/057699
§ 371 (c)(1),
(2) Date: Oct. 5, 2020

(87) PCT Pub. No.: WO2019/192905
PCT Pub. Date: Oct. 10, 2019

(65) Prior Publication Data
US 2021/0172762 A1    Jun. 10, 2021

(30) Foreign Application Priority Data
Apr. 4, 2018   (DE) ............... 10 2018 205 065.1

(51) Int. Cl.
*G01C 25/00* (2006.01)
*B60W 50/04* (2006.01)
(Continued)

(52) U.S. Cl.
CPC ......... *G01C 25/005* (2013.01); *B60W 50/045* (2013.01); *G01C 21/30* (2013.01); *B60W 2050/0083* (2013.01); *B60W 2556/50* (2020.02)

(58) Field of Classification Search
CPC ... G01C 25/005; G01C 21/30; B60W 50/045; B60W 2050/0083; B60W 2556/50
See application file for complete search history.

(56) References Cited

U.S. PATENT DOCUMENTS 9,273,966 B2 * 3/2016 Bartels ................ G01C 21/165
9,719,801 B1    8/2017 Ferguson et al.
(Continued)

FOREIGN PATENT DOCUMENTS

DE    102008040985 A1    2/2010    ............... B60R 1/00
DE    102012009577 A1    11/2012    ............... B60R 1/00
(Continued)

OTHER PUBLICATIONS

Gao, Chao et al., "On-line Calibration of Multiple LIDARs on a Mobile Vehicle Platform," IEEE International Conference on Robotics and Automation, p. 279-284, May 3, 2010.
(Continued)

*Primary Examiner* — Geepy Pe
*Assistant Examiner* — Daniel Tyler Reich
(74) *Attorney, Agent, or Firm* — Slayden Grubert Beard PLLC

(57) ABSTRACT

A method for calibrating at least one position sensor in a vehicle, comprising: saving a map in the vehicle with at least one item of virtual location information from the environment of a predefined calibration route, moving the vehicle on the predefined calibration route, detecting at least one item of actual location information via the at least one position sensor while the vehicle moves on the predefined
(Continued)

calibration route, carrying out a comparison between the at least one item of virtual location information and the at least one item of actual location information, calculating a map-based movement of the vehicle within the saved map based on the comparison, calculating an odometry-based movement of the vehicle, and calibrating the at least one position sensor based on a comparison between the map-based movement and the odometry-based movement.

14 Claims, 1 Drawing Sheet

(51) Int. Cl.
*G01C 21/30* (2006.01)
*B60W 50/00* (2006.01)

(56) References Cited

U.S. PATENT DOCUMENTS

| | | | |
|---|---|---|---|
| 9,916,703 B2 | 3/2018 | Levinson et al. | |
| 9,933,515 B2* | 4/2018 | Prokhorov | G01S 7/4972 |
| 2001/0006554 A1 | 7/2001 | Kakinami | 382/104 |
| 2011/0211046 A1 | 9/2011 | Stumber et al. | 348/47 |
| 2012/0173185 A1 | 7/2012 | Taylor et al. | 702/104 |
| 2014/0104437 A1 | 4/2014 | Chao et al. | 348/187 |
| 2016/0093065 A1 | 3/2016 | Vejarano et al. | 382/103 |
| 2016/0275682 A1 | 9/2016 | Natroshvili et al. | 348/187 |
| 2016/0353099 A1 | 12/2016 | Thomson et al. | 348/148 |
| 2017/0124781 A1 | 5/2017 | Douillard et al. | 701/30.6 |
| 2018/0045536 A1 | 2/2018 | Kümmerle et al. | |
| 2018/0196127 A1* | 7/2018 | Harada | G08G 1/161 |
| 2019/0049242 A1* | 2/2019 | Adams | G01B 21/16 |
| 2019/0204425 A1* | 7/2019 | Abari | G01S 13/931 |

FOREIGN PATENT DOCUMENTS

| | | | |
|---|---|---|---|
| DE | 102014114221 A1 | 3/2016 | G06T 7/20 |
| DE | 102015205088 A1 | 9/2016 | B60R 16/02 |
| DE | 102016104729 A1 | 9/2017 | G01B 11/24 |
| DE | 102016204654 A1 | 9/2017 | B60W 40/02 |
| DE | 102018205065 A1 | 10/2019 | B60W 40/02 |
| EP | 2096460 A2 | 9/2009 | G01C 3/00 |
| EP | 2597614 A1 | 5/2013 | G06T 7/00 |
| EP | 2736013 A2 | 5/2014 | G06T 7/00 |
| GB | 2543251 A | 4/2017 | G05D 1/02 |
| WO | 2019/192905 A1 | 10/2019 | B60W 50/00 |

OTHER PUBLICATIONS

German Office Action, Application No. 102018205065.1, 5 pages, dated Nov. 6, 2018.

International Search Report and Written Opinion, Application No. PCT/EP2019/057699, 22 pages, dated Jul. 12, 2019.

* cited by examiner

METHOD FOR CALIBRATING A POSITION SENSOR IN A VEHICLE, COMPUTER PROGRAM, STORAGE MEANS, CONTROL UNIT AND CALIBRATION ROUTE

CROSS-REFERENCE TO RELATED APPLICATIONS

This application claims priority to German Patent Application DE 10 2018 205 065.1, filed on Apr. 4, 2018 with the German Patent and Trademark Office. The contents of the aforesaid Patent Application are incorporated herein for all purposes.

TECHNICAL FIELD

The present invention relates to a method for calibrating a position sensor in a vehicle, in particular in a motor vehicle. The invention also relates to a computer program for carrying out a calibration method, a storage means for storing a computer program, and a control unit having a computer program saved thereon. Moreover, the invention relates to a calibration route.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A plurality of position sensors is typically installed in modern vehicles. By means of the position sensors, features from the environment of the vehicle can be detected and analyzed. Depending on the detected features from the environment of the vehicle, a driver of the vehicle can be informed or warned. In at least partially autonomous driving systems, direct interventions in the vehicle control can be made based on the detected environment information. In the case of a function such as the lane departure warning system, for example a road line on the street can be detected, the distance of the vehicle to this line can be calculated, and a corresponding steering intervention can be carried out.

For reliable functioning of such methods and systems, it is important to know the precise position and orientation of the position sensor or position sensors in the vehicle. If the installation positions are not correct due to installation-related tolerances within production, this leads to malfunctions of the sensor system. To account for this problem, calibration systems for calibrating the position sensors are built in the production facilities or in the factory at the production location of the vehicle. In the course of the calibration, vehicle position and alignment relative to the calibration stand are detected. The position and alignment of the position sensors relative to the calibration stand are also detected. Based on this information, the position and alignment of the position sensors relative to the vehicle can then be calculated and correspondingly calibrated. This procedure, however, is time-consuming and therefore also leads to correspondingly high costs during the production of the vehicle.

Furthermore, it is desirable to be able to offer an end customer a vehicle that has a sensor system that is as fully calibrated as possible. Training of the sensor system by the customer should therefore be avoided to the extent possible.

SUMMARY

An object exists to at least partially account for the problem described in the preceding when calibrating a position sensor in a vehicle. In particular, an object exists to create a method, a computer program, a storage means having a computer program, a control unit having a computer program installed thereon, and a calibration route for simply and cost-effectively calibrating a position sensor in a vehicle.

The preceding object is achieved by the subject matter of the independent claims. Embodiments of the invention are discussed in the dependent claims and the following description.

DESCRIPTION

Figure 1:
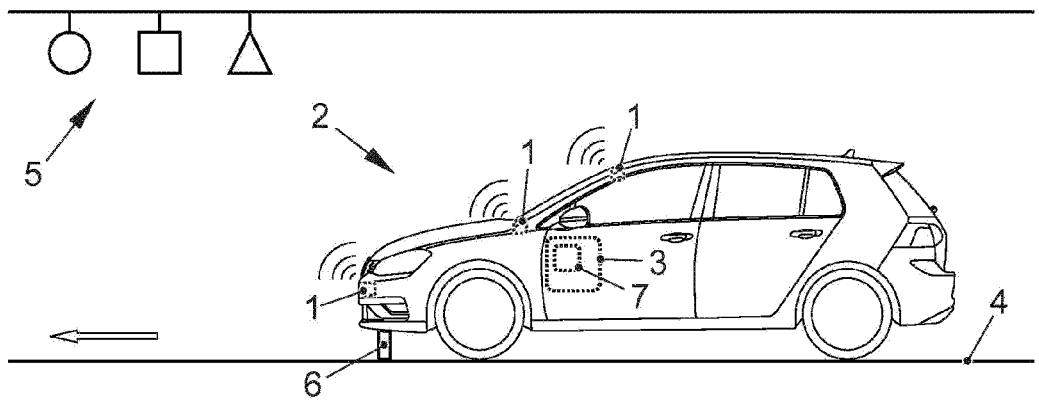
FIG. 1 shows a vehicle on a calibration route according to an embodiment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In this regard, features that are described in connection with the method naturally also apply in conjunction with the computer program, the storage means, the control unit, the calibration route, and in each case vice versa, and therefore, with respect to the disclosure, reference is or can be made interchangeably to the individual aspects.

According to a first exemplary aspect of the present invention, a method for calibrating at least one position sensor in a vehicle is provided. The method comprises the following steps:

saving a map in the vehicle with at least one item of virtual location information, moving the vehicle on a predefined calibration route, detecting at least one item of actual location information via the at least one position sensor while the vehicle moves on the predefined calibration route, carrying out a comparison between the at least one item of virtual location information and the at least one item of actual location information, calculating a map-based movement of the vehicle within the saved map based on the comparison, calculating an odometry-based movement of the vehicle, and calibrating the at least one position sensor based on a comparison between the map-based movement and the odometry-based movement.

In this case, the at least one item of virtual location information may originate from the environment of the predefined calibration route.

In the context of the present aspect, it has been recognized that methods for calibrating the sensor system of the vehicle, which until now had only been used in outdoor areas, can also be integrated into the manufacturing process of the vehicle without a temporally separate manufacturing step. In this case, for example a route that the vehicle has to travel anyway during manufacturing at the production location is used as the calibration route. This means that the vehicle for example is moved at the production location of the vehicle on a predefined calibration route which corresponds with the usual manufacturing route, meaning the route on which vehicles would also theoretically be moved without sensor calibration. This way, time and therefore also corresponding cost can be saved. That being said, the calibration route can also be a predefined route remote from the production location.

In some embodiments, it is possible to save the map in the vehicle with at least one item of virtual location information from the production location of the vehicle and to move the vehicle on the predefined calibration route at the production location of the vehicle. For example, the vehicle is moved on the predefined calibration route during its manufacture.

During the calibration according to the present aspect, in principle no worker is required to attend to the calibration on the calibration route. This also saves time and cost.

There is also no special equipment required to carry out the present method. All objects, or respectively environment features at the production location, or respectively on the manufacturing route of the vehicle, can serve as location information. Accordingly, the prementioned method can be executed particularly easily, for example integrated into existing process operations.

The calibration of the at least one position sensor may comprise a determination of the relative position of the at least one position sensor in the vehicle. That means that in the course of the calibration, the position of the at least one position sensor relative to the rest of the vehicle may be determined. Tis way, tolerance-related installation dimensions which could lead to false measurements by the at least one position sensor may be compensated for.

During the calibration of the at least one position sensor, the map-based movement and the odometry-based movement are compared with each other, and possible differences between the respective movements are ascertained. Possible misplacements of the least one position sensor, which can be caused, for example, by installation imprecisions or component tolerances, may then be ascertained from the different movements. The ascertained errors may then be used for the calibration of the at least one position sensor.

The at least one position sensor may in some embodiments be at least one camera sensor of a camera system of the vehicle, for example in the form of an image sensor. The at least one position sensor may in some embodiments also be a distance sensor, for example in the form of an ultrasonic sensor. In general, the at least one position sensor may be, e.g., understood as at least one position sensor for ascertaining the position of the vehicle.

An odometry-based movement of the vehicle is understood to mean a movement of the vehicle which is calculated based on the vehicle odometry. Odometry is understood here to mean a method for ascertaining position and/or orientation of the vehicle based on data of a propulsion system of the vehicle.

An item of virtual location information is understood here to mean a digital item of location information saved in the vehicle. The virtual location information corresponds to the extent possible with the actual location information to be detected. The actual location information is understood to mean an item of physical location information which can be actually detected or measured by the at least one position sensor.

Calibration is understood here to mean a measuring process for the reliably reproducible establishment and documentation of a possible deviation of the map-based movement, which is calculated by means of the at least one position sensor, in relation to the odometry-based movement which is calculated by means of the odometry of the vehicle.

The map is understood to mean a digital land map of at least selected parts of the environment of the predefined calibration route. The map can be saved in the camera system, for example on a storage means of the camera system.

According to some embodiments, it is possible to tow the vehicle on the predefined calibration route with a towing device. This way, the odometry-based movement may be calculated, or respectively determined particularly precisely. The at least one position sensor may be calibrated correspondingly precisely. Another benefit of the towing device is that no person is required to drive, or respectively move the vehicle. This way, cost can be saved. In addition, this allows a precise movement of the vehicle along the calibration route to be achieved in a simple manner. The towing device may have a sled, a pole, a rope, and/or a chain with which the vehicle is towed along the predefined calibration route. The sled may be provided and used without a pole, chain, and/or rope in the form of an autonomous sled.

It is also possible that, in a method according to the present aspect, the at least one item of actual location information is detected above the vehicle in the direction of gravity. This means that the at least one item of actual location information is detected on, or respectively above the calibration route on top of, or respectively above the vehicle. The at least one item of actual location information may be understood to mean predefined objects on, or respectively at the calibration route. Such objects are in particular calibration signs or panels. These objects for example are attached to a ceiling above the calibration route at the production location of the vehicle. Therefore, the objects are not in the way of other people or vehicles at the production location of the vehicle. The objects may also be easily mounted on a ceiling. It is also relatively improbable that the objects on the ceiling will be covered by other objects and therefore no longer be usable for the calibration. The at least one item of actual location information on the calibration route is understood to mean at least one item of actual location information on, at, next to, or above the calibration route, meaning at a position at which the at least one item of actual location information can be recognized, or respectively detected by the at least one position sensor on the vehicle which is moving on the calibration route.

It is also possible that, in a method according to the present aspect, the vehicle is moved on the predefined calibration route at least partially inside a building. The objects mentioned in the preceding can be mounted above the calibration route particularly easily inside a building. In addition, the predominant environmental conditions inside a building are typically uniform, since they are independent of weather, or may be relatively easily created as desired. This is beneficial for the calibration. The building may be understood to mean, for example, a factory building at the production location of the vehicle.

In a method according to the present aspect, it is also possible to carry out the calibration iteratively using a plurality of comparisons between the map-based movement and the odometry-based movement. Therefore, a calibration that is as robust as possible may be provided. Here it may be beneficial if errors are observed and evaluated, for example averaged, over a plurality of measurements using statistical methods.

Moreover, it is possible in a method according to the present aspect and in some embodiments, to calculate the camera-based movement of the vehicle by means of multiple position sensors and to calibrate the position sensors based on a comparison between the map-based movement and the odometry-based movement simultaneously, or respectively together. In tests in the context of the present aspect, it has been established that calibrating multiple measurements from various position sensors together and correspondingly considering them as a whole is always more accurate than the sum of individual results. Moreover, this allows the calibration for all the position sensors of the vehicle to be completed particularly quickly and therefore also cost-effectively in this way. Joint calibration may be carried out by means of big data analysis, in the course of which the map-based and odometry-based data are processed at least partially in parallel and/or by means of mutual consideration.

According to another exemplary aspect, a computer program is provided. The computer program comprises commands which, during the execution of the computer program by a computer, cause the computer to execute the method described in detail in the preceding. Therefore, the computer program according to the present aspect produces the same benefits as those described in detail with reference to the method according to the preceding aspect.

The computer program may be implemented as a computer-readable instruction code in any suitable programming language such as, for example, in JAVA or C++. The computer program may be saved on a computer-readable storage medium such as a data disk, a removable drive, a volatile or non-volatile memory, or a built-in memory/processor. The instruction code may program a computer or other programmable devices such as a control unit such that the desired functions are executed. The computer program may also be provided, or respectively be on a network such as, for example, the Internet, from which it may be downloaded by a user as needed. The computer program may be realized, or respectively be in the form of software, or in the form of a computer program product by means of one or more special electronic circuits, i.e., in hardware, or in any desired hybrid form, i.e., by means of software components and hardware components.

According to another exemplary aspect, a storage means having a computer program saved thereon is provided, wherein the computer program is configured and designed to carry out a method as described in the preceding. The storage means therefore also provides the benefits described in the preceding. Storage means may be understood to mean a data carrier such as a thumb drive on which the computer program is saved.

Moreover, a control unit having a computer program installed thereon is provided according to another exemplary aspect, which is configured and designed to carry out a method as described in the preceding. The control unit also provides the benefits described in the preceding. The control unit is for example part of a vehicle control, or a vehicle control unit.

Moreover and according to another exemplary aspect, a calibration route is provided. The calibration route is for example located at a production location of the vehicle. The calibration route has at least one predefined item of location information, based on which at least one position sensor of the vehicle may be calibrated by a method as described in the preceding. The benefits described in the preceding are thus also achievable by the prementioned calibration route.

Additional measures for improvement are apparent from the following description of various exemplary embodiments, which are shown schematically in the FIGS.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a vehicle 2 on a calibration route 4 at a production location of the vehicle 2. Various predefined items of location information 5 in the form of three differently designed calibration panels spaced apart from each other are affixed on or above the calibration route 4. The calibration panels can thus be detected above the vehicle 2 in the direction of gravity. The vehicle 2 shown in FIG. 1 has three position sensors 1.

The vehicle 2 is affixed to a towing device 6 by which the vehicle can be towed along a predefined track on the calibration route 4. The vehicle has a control unit 3 having a computer program 7 installed thereon which is configured and designed to carry out a method described below. The computer program 7 correspondingly comprises commands which, during the execution of the computer program 7 by a computer, cause the computer to execute the desired method. The computer program 7 can also be provided on a separate storage means.

Figure 2:
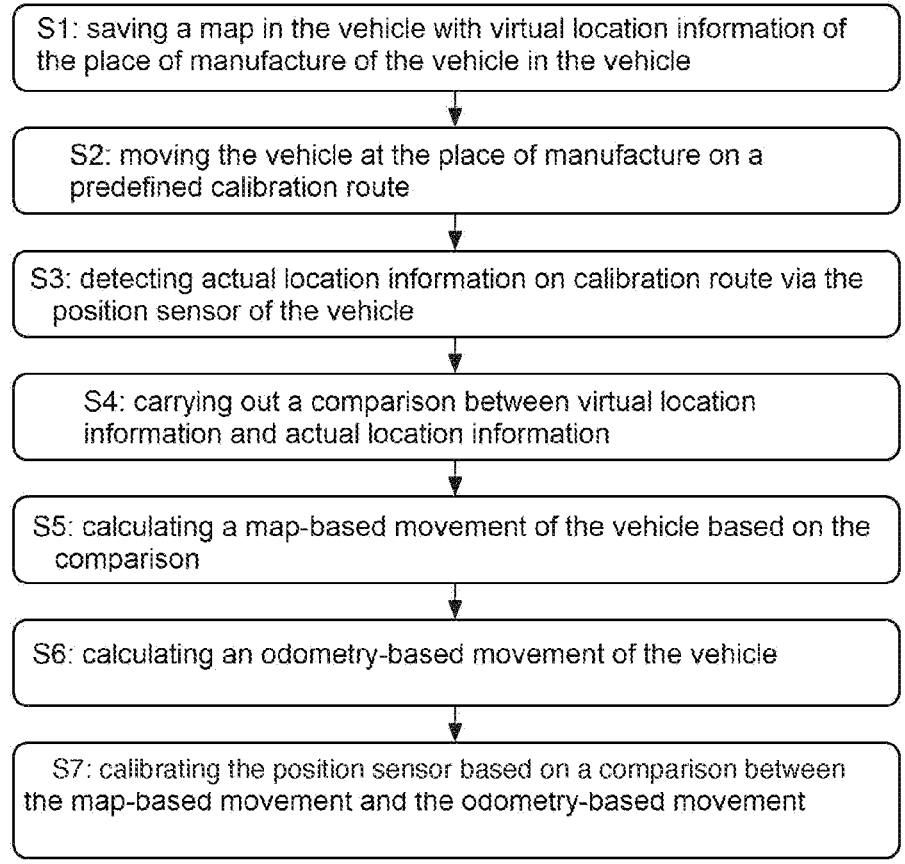
FIG. 2 shows a flow chart of a method according to am embodiment.

With reference to FIG. 2, a method for calibrating the position sensors 1 of the vehicle 2 will be explained below. In doing so, a vehicle will be assumed in which position sensors 1 have already been installed.

In the method, in a first step S1, a map is saved in the vehicle 2 with items of virtual location information from the production location of the vehicle 2. The items of virtual location information comprise digital versions of the calibration panels shown in FIG. 1. In a second step S2, the vehicle 2 is moved, or respectively towed on the calibration route 4 on a predefined track by means of the towing device 6. Then, in a third step S3, the actual location information 5 in the form of the calibration panels is detected by the position sensors 1, while the vehicle 2 moves on the calibration route 4 in a building on the factory premises of the production location of the vehicle 2. After that, in a fourth step S4, a comparison between the virtual location information and the detected actual location information 5 is carried out. Based on the comparison, in a fifth step S5, a map-based movement of the vehicle 2 within the saved map is carried out. In a sixth step S6, an odometry-based movement of the vehicle 2, meaning a movement of the vehicle 2 based on the odometry, is calculated. Then, in a seventh step S7, the position sensors 1 can be calibrated based on a comparison between the map-based movement and the odometry-based movement.

The invention allows for other design principles in addition to the embodiments shown. Therefore, the steps shown in FIG. 2 do not need to proceed successively as shown, but can also occur in a different sequence and/or simultaneously.

The position sensors 1 for example may be calibrated at least in sections simultaneously based on the comparison between the map-based movement and the odometry-based movement. The calibration can be carried out iteratively using a plurality of comparisons between the map-based movement and the odometry-based movement. In this case, errors are observed and evaluated over a plurality of measurements using statistical methods. The ascertained errors can be saved on a memory in the vehicle 2, for example on a memory of a camera system of the vehicle 2, as corresponding parameters and used for further calculations.

LIST OF REFERENCE NUMERALS

1 Sensor
2 Vehicle
3 Control unit
4 Calibration route
5 Location information
6 Towing device
7 Computer program The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for calibrating at least one position sensor in a motor vehicle, comprising:
    accessing a map in a memory of the vehicle with at least one item of virtual location information from an environment of a predefined calibration route, which predefined calibration route is integrated with an indoor manufacturing route for the vehicle at a production location of the vehicle;
    moving the vehicle on the predefined calibration route as a part of manufacturing the vehicle;
    detecting at least one item of actual location information via the at least one position sensor, while the vehicle moves on the predefined calibration route;
    carrying out a comparison between the at least one item of virtual location information and the at least one item of actual location information;
    calculating a map-based movement of the vehicle within the map based on the comparison;
    calculating an odometry-based movement of the vehicle based on data of a propulsion system of the vehicle; and
    calibrating the at least one position sensor based on a comparison between the map-based movement and the odometry-based movement.

2. The method of claim 1, wherein the vehicle is towed on the predefined calibration route with a towing device.

3. The method of claim 2, wherein the at least one item of actual location information is detected above the vehicle in the direction of gravity.

4. The method of claim 2, wherein the vehicle is moved on the predefined calibration route at least partially inside a building.

5. The method of claim 2, wherein the calibrating is carried out iteratively using a plurality of comparisons between the map-based movement and the odometry-based movement.

6. The method of claim 1, wherein the at least one item of actual location information is detected above the vehicle in the direction of gravity.

7. The method of claim 6, wherein the vehicle is moved on the predefined calibration route at least partially inside a building.

8. The method of claim 6, wherein the calibrating is carried out iteratively using a plurality of comparisons between the map-based movement and the odometry-based movement.

9. The method of claim 1, wherein the vehicle is moved on the predefined calibration route at least partially inside a building.

10. The method of claim 1, wherein the calibrating is carried out iteratively using a plurality of comparisons between the map-based movement and the odometry-based movement.

11. The method of claim 1, wherein a camera-based movement of the vehicle is calculated using multiple position sensors, and the multiple position sensors are calibrated simultaneously based on a comparison between the map-based movement and the odometry-based movement.

12. A non-transitory medium comprising instructions that, during the execution by a computer of a motor vehicle, cause the computer to:
    accessing a map in a memory of the vehicle with at least one item of virtual location information from an environment of a predefined calibration route, which predefined calibration route is integrated with an indoor manufacturing route for the vehicle at a production location of the vehicle;
    moving the vehicle on the predefined calibration route as a part of manufacturing the vehicle;
    detecting at least one item of actual location information via the at least one position sensor, while the vehicle moves on the predefined calibration route;
    carrying out a comparison between the at least one item of virtual location information and the at least one item of actual location information;
    calculating a map-based movement of the vehicle within the map based on the comparison;
    calculating an odometry-based movement of the vehicle based on data of a propulsion system of the vehicle; and
    calibrating the at least one position sensor based on a comparison between the map-based movement and the odometry-based movement.

13. A control unit for a motor vehicle, configured for:
    accessing a map in a memory of the vehicle with at least one item of virtual location information from an environment of a predefined calibration route, which predefined calibration route is integrated with an indoor manufacturing route for the vehicle at a production location of the vehicle;
    moving the vehicle on the predefined calibration route as a part of manufacturing the vehicle;

detecting at least one item of actual location information via the at least one position sensor, while the vehicle moves on the predefined calibration route;

carrying out a comparison between the at least one item of virtual location information and the at least one item of actual location information;

calculating a map-based movement of the vehicle within the map based on the comparison;

calculating an odometry-based movement of the vehicle based on data of a propulsion system of the vehicle; and calibrating the at least one position sensor based on a comparison between the map-based movement and the odometry-based movement.

14. A calibration route for calibrating a motor vehicle; wherein, the calibration route is configured as a track for the vehicle to travel on during a calibration of the vehicle; wherein the calibration route comprises at least one item of predefined location information, based on which at least one position sensor of the vehicle can be calibrated; and wherein the predefined calibration route is configured to be integrated with an indoor manufacturing route for the vehicle at a production location of the vehicle.

* * * * *